Dec. 8, 1925.
A. C. VAN HOOYDONK
1,564,727
TROLLEY RETRIEVER
Filed May 9, 1922
3 Sheets-Sheet 1
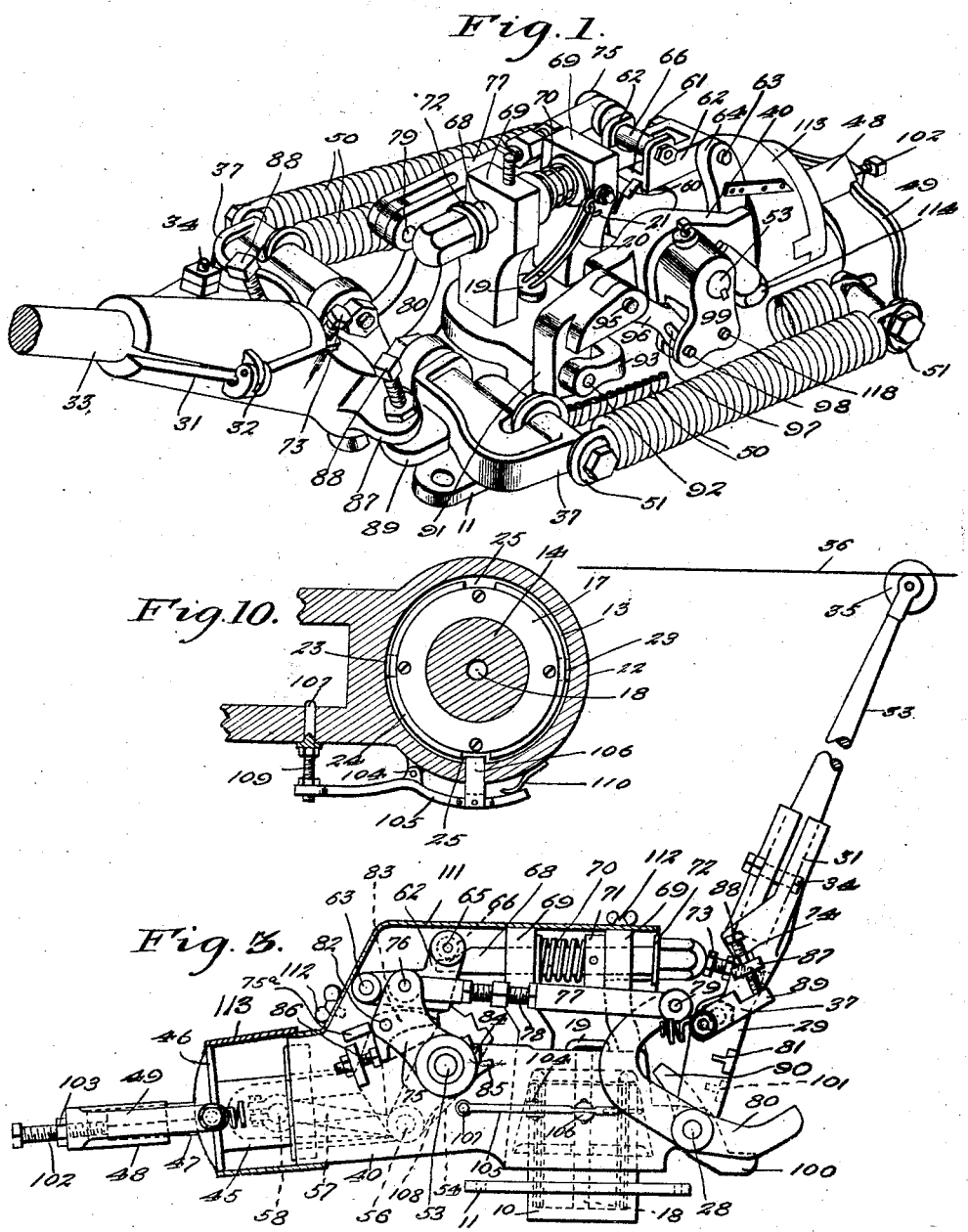

Dec. 8, 1925.  
A. C. VAN HOOYDONK  
1,564,727  
TROLLEY RETRIEVER  
Filed May 9, 1922  
3 Sheets-Sheet 2
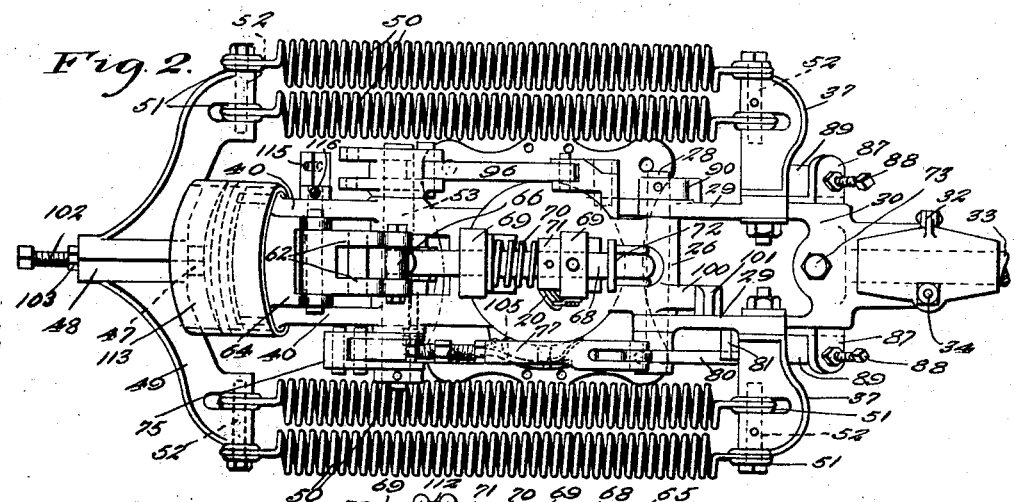
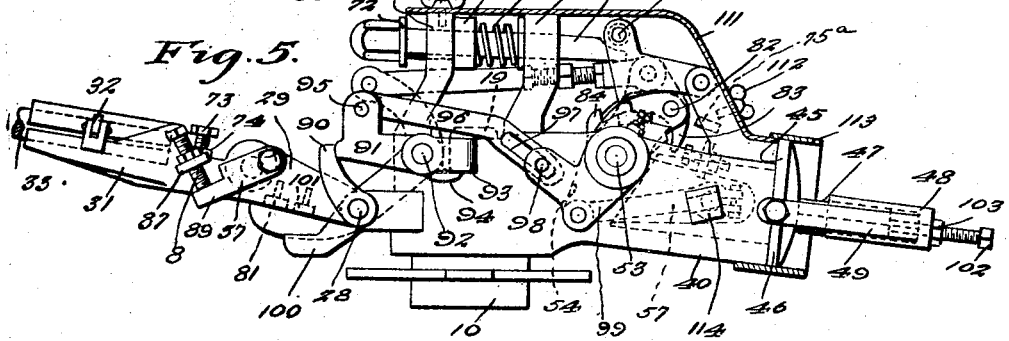
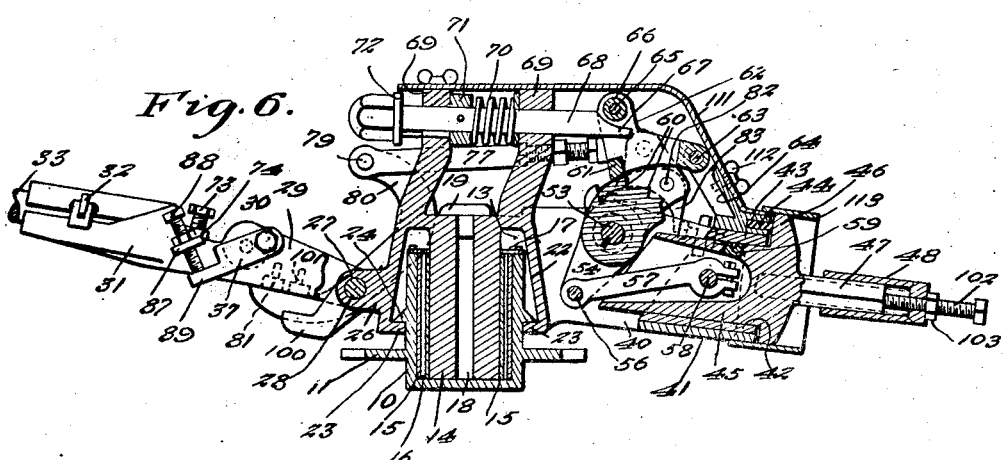
A. C. Van Hooydonk INVENTOR
BY Victor J. Evans ATTORNEY
WITNESSES Dec. 8, 1925.　　　　　　　　　　　　　　　　　　　　　1,564,727
A. C. VAN HOOYDONK
TROLLEY RETRIEVER
Filed May 9, 1922　　　　3 Sheets-Sheet 3
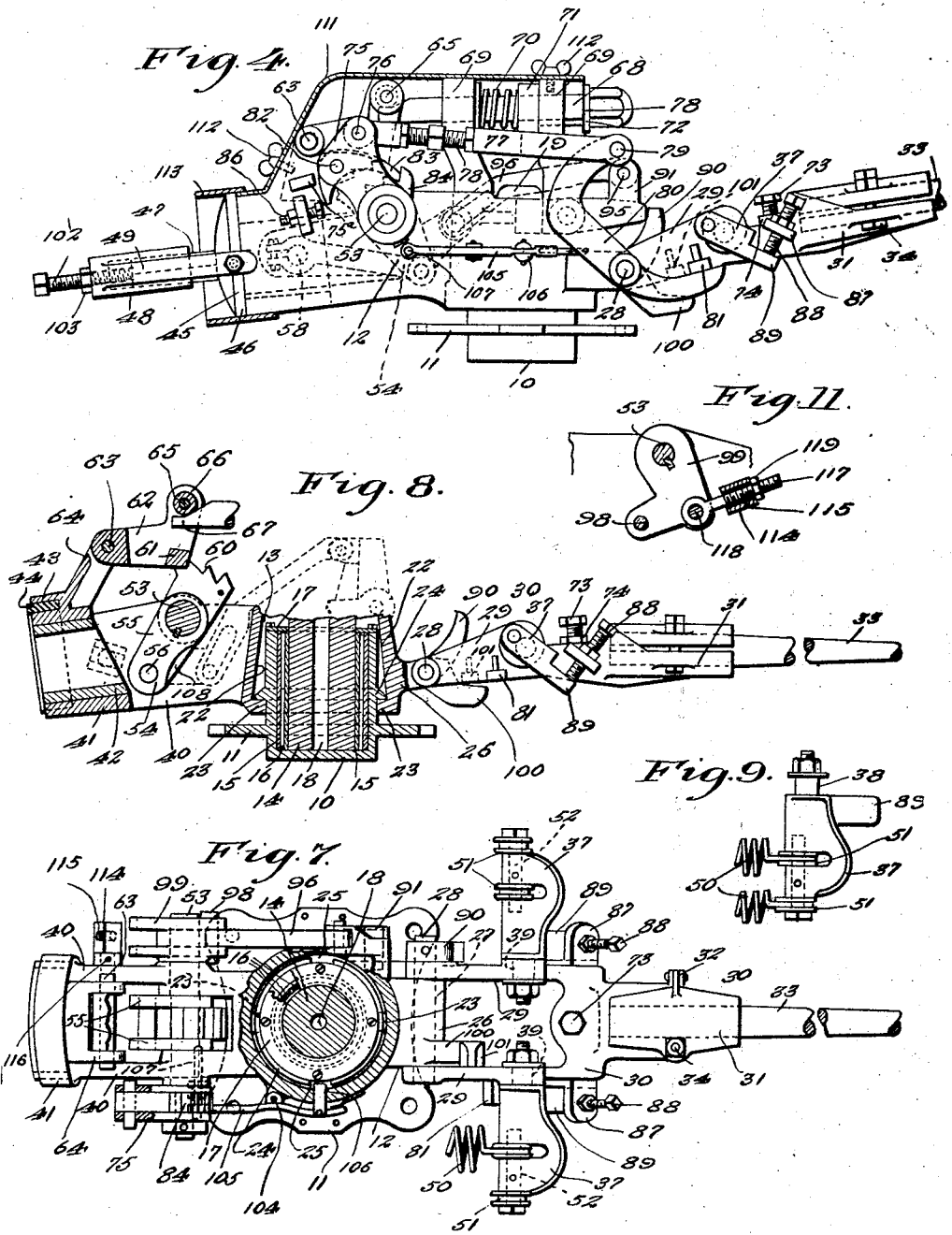

Patented Dec. 8, 1925.

1,564,727

UNITED STATES PATENT OFFICE.

ADRIAN C. VAN HOOYDONK, OF MONROE, MICHIGAN.

TROLLEY RETRIEVER.

Application filed May 9, 1922. Serial No. 559,662.

*To all whom it may concern:*

Be it known that I, ADRIAN C. VAN HOOYDONK, a subject of the Queen of Holland, residing at Monroe, in the county of Monroe and State of Michigan, have invented new and useful Improvements in Trolley Retrievers, of which the following is a specification.

This invention relates to trolley retrievers and has for an object the provision of a device which will normally hold a trolley in contact with an overhead wire and which will automatically retrieve the trolley pole should the wheel accidentally leave the wire.

Another object of the invention is the provision of a trolley retriever wherein upward movement of the trolley pole is limited and in which the said pole will automatically move to a lowered position as soon as its limit of upward movement is reached, so that injury due to contact of the trolley pole and wire supporting cross arms, is prevented.

Another object of the invention is the provision of means for automatically locking the trolley pole in lowered position as soon as such position is reached, thereby preventing rebound or return upward movement until the locking means is manually released.

Another object of the invention is the provision of means whereby the device may be restored to its normal condition, so that the wheel may again engage the trolley with the parts reset for further automatic operation.

Another object of the invention is the provision of a trolley retriever, wherein springs under tension are utilized for maintaining contact between the wheel and wire, means being provided for regulating the tension of the springs whereby proper contact may be obtained without undue frictional engagement, so that wear upon the wire and wheel is reduced to a minimum.

Another object of the invention is the provision of means for mounting the device to permit of free and smooth horizontal swinging movement, causing the wheel to accurately follow the wire and insuring proper contact between the wheel and wire with the least possible amount of friction.

A further object is the provision of means whereby the device may be easily and quickly removed from and replaced upon its bearing base, so that the device may be adjusted to and removed from a car in and with a minimum amount of time and labor.

With the above and other objects in view, the invention further includes the following novel features and details of construction, to be hereinafter more fully described, illustrated in the accompanying drawings and pointed out in the appended claims.

In the drawings:—

Figure 1 is a perspective view of a trolley retriever constructed in accordance with the present invention with the housing removed.

Figure 2 is a top plan view of the same.

Figure 3 is a side elevation showing the trolley pole at the limit of its upward movement and just prior to its retrieving operation, the housing of the device being shown in section.

Figure 4 is a view similar to Figure 3 showing the trolley pole locked in its lowered position.

Figure 5 is a view similar to Figure 4 looking at the opposite side of the device.

Figure 6 is a central longitudinal sectional view of the invention with the parts in the position shown in Figure 5 and with certain of the parts in elevation.

Figure 7 is a top plan view with certain parts in section and others removed.

Figure 8 is a longitudinal sectional view with certain parts in elevation and others removed.

Figure 9 is a detail plan view of one of the pivoted spring attaching arms.

Figure 10 is a detail sectional view illustrating the means for locking the device to prevent horizontal swinging movement.

Figure 11 is a fragmentary sectional view illustrating an auxiliary means for maintaining tension in the springs.

Referring in detail to the drawings, wherein like characters of reference denote corresponding parts, the reference character 10 indicates a bearing base which is of cup-shaped formation and which is provided with an attaching flange 11 spaced upward from the lower end of the base to provide means for securing the device in place.

Mounted for rotation upon the bearing base is a stand which is designated in its entirety by the reference character 12. This stand is provided with a socket 13 for the reception of the cup-shaped member, while located within this socket is a concentrically arranged post 14. This post extends downwardly within the cup-shaped bearing base 10 and located within the latter and surrounding the post 14 are spaced sleeves or bushings 15 which are separated by antifriction devices, such as roller bearings 16. The upper end of the cup-shaped bearing base 10 is provided with a closure ring 17 which is secured to the bearing member and extends over the upper ends of the bushings 15 and roller bearings 16 and closely surrounds the post 14. This protects the antifriction bearing by preventing the entrance of dust and dirt and at the same time provides a retaining means for the bushings 15 and roller bearings 16, so that the post 14 may be removed and replaced without disturbing the bushings or bearings. This greatly facilitates removing and replacing the trolley stands so that the latter may be readily changed from one car to another. The post 14 is provided with a central longitudinally extending bore 18 for the insertion of a suitable lubricant. This bore extends from one to the other end of the post, so that the lubricant may reach the bottom of the bearing base 10 for the supply of lubricant to the bearings. The upper end of the bore 18 is closed by a removable plug 19 which is held against accidental loss by means of a flexible loop 20, the said loop being attached to a hook 21 which is carried by a member to be hereinafter described.

The walls of the socket 13 are inclined as shown at 22 and extending diametrically from the lower ends of these walls and into the mouth of the socket 13 are oppositely arranged lugs 23. These lugs are adapted to engage beneath a flange 24 which extends around the outside of the bearing base and is spaced above the flange 11. The flange 24 is interrupted at diametrically opposite points to provide notches 25 for the passage of the lugs 23, so that the stand may be placed over the bearing base 10 and the lugs 23 passed through the notches 25 and the stand given a quarter turn in either direction to arrange the lugs beneath the flange 24, whereupon the stand will be swiveled upon the bearing base in a manner to permit of free and steady horizontal swinging movement. As the trolley pole (as will be hereafter explained) is carried by the stand, the wheel will be caused to quickly and readily adjust itself to accurately follow the wire and thus reduce liability of the wheel jumping or leaving the wire, the steady and sensitive movement of the stand 12 maintaining proper engagement between the wheel and wire with the least possible amount of friction. The force or pressure necessary to maintain proper contact between the wheel and wire may thus be materially reduced, so that with the reduction of friction, wear upon the wheel and wire is reduced to a minimum.

Formed integral and extending transversely and horizontally from the wall of the socket 13 is a boss 26, which is provided with a bore 27. This bore provides a bearing for a pin 28 upon which is pivotally mounted the inner ends of spaced arms 29, forming part of a yoke 30. The outer end of this yoke carries clamps 31, one section of which is formed integral with the yoke, while the opposite section is pivotally mounted as shown at 32 so that it may be clamped over the end of a trolley pole 33. The pivoted section is held in clamping position by means of a bolt 34. The opposite end of the trolley pole carries the usual or any preferred trolley wheel 35, which is adapted to travel along a trolley wire 36. By this construction, the trolley pole 33 will be capable of vertical swinging movement, so that it may be raised and lowered, and accurately adjust itself to different elevations of the trolley wire, while the horizontal swinging movement of the stands upon the bearing base will permit of any necessary lateral movement.

Pivotally mounted upon the arms 29 of the yoke 30 and extending in opposite directions are oppositely disposed aligned arms 37. The inner ends of these arms carry studs 38 which have bearings in openings 39 provided in the arms 29, while the outer ends of the studs 38 are threaded for the reception of nuts, whereby the arms 38 will be pivotally connected to the arms 29 in a manner to permit of free movement.

Extending upon the opposite side of the socket 13 are spaced parallel arms 40, which carry at their outer ends a guide sleeve 41, having a bushing or lining 42. The guide sleeve 41 is provided at its outer end with a groove 43 which extends almost entirely around the end of the sleeve and which receives a yieldable or compressible strip 44, whose edge extends slightly beyond the end of the sleeve 41 so as to provide a stop for a purpose which will later appear.

Operating within the bushing 42 is a plunger 45, whose outer end is surrounded by a flange 46, the said flange being adapted to engage the compressible strip or stop 44 so as to limit the inward movement of the plunger 45. The plunger 45 is provided at its outer end with an axially disposed extension 47 of preferably rectangular cross section and this extension is receivable within a similarly shaped sleeve 48 which forms a part of a yoke 49. This yoke extends transversely of the stand 12 and has its opposite ends disposed opposite the pivoted arms 37. These latter arms and the ends of the yoke 49 are connected by coiled springs 50, whose opposite ends are engaged around grooved disks 51 which are mounted for rotation upon studs 52, carried by the arms 37 and the yoke 49. As the pivotal connection between the arms 37 and the arms 29 is beyond the pivotal connection between the last mentioned arms and the yoke 26, the action of the springs 50 when tensioned will be to force the trolley pole 33 upward in a direction toward the wire 36.

The tension of the springs 50 is controlled by the relative positions of the yoke 49 and arms 37 and in order to adjust the yoke with respect to these arms, there is provided a rock shaft 53, which is mounted in bearings provided in the spaced parallel arms 40. This rock shaft has secured thereon a lever 54, one end of which is bifurcated to provide spaced parallel arms 55 and pivotally secured between these arms upon a pin 56, is one end of a connecting rod 57. The opposite end of this rod is pivotally connected with the plunger 45 by means of a pin 58, an opening which is normally closed by a plug 59 being provided for the purpose of securing the end of the arm 57 upon the pin 58. The opposite end of the lever 54 is provided with teeth 60 which are arranged in arcuate formation and which are adapted to be engaged by a bar 61 which connects spaced plates 62. These plates are pivotally mounted as shown at 63 upon a bracket 64 which extends from the cylindrical guide 41, so that a gravity dog is provided whose purpose is to hold the lever 54 and consequently the rock shaft 53 against movement in one direction. Also connecting the plates 62 is a pin 65, which is surrounded by a bushing 66 and extending beneath this bushing is one end 67 of a latch bar 68. This latch bar is slidably keyed in bearings provided in spaced lugs 69 which extend upward from the top of the socket 13, while surrounding the latch bar between these lugs is a coiled spring 70. One end of this spring bears upon a washer which abuts one of the lugs 69, while the opposite end of the spring 70 bears against a collar 71 which is secured to the latch bar 68, the purpose of the spring being to force the latch bar in a direction away from the bushing 66. This movement is limited however by the engagement of the collar 71 with the other bearing lug 69. Movement of the latch bar 68 in an opposite direction is limited by a head 72 which is carried by the said bar.

Carried by the yoke 30 of the trolley arm 31 is an adjustable stop herein shown in the form of a threaded screw or bolt 73. This screw or bolt is adjustable in the yoke 30 and is held in adjusted position by means of a lock nut 74. When properly adjusted the head of the bolt 73 will be positioned to engage the head 72 of the latch bar 68 when the trolley wheel 35 leaves the trolley wire and moves upward, the purpose being to cause the bolt 73 to force the latch bar 68 inward so as to disengage the bar 61 from the teeth 60 of the lever 54 and permit the latter to move for a purpose which will be later explained.

Mounted upon the rock shaft 53 is a frame 75, which includes spaced parallel plates which are pivotally connected as shown at 76 to one end of a rod or bar 77. The length of this bar is adjustable as indicated at 78 and its opposite end is pivotally connected as shown at 79 to one end of a rocker arm 80. The opposite end of this arm is located in the path of movement of a lug 81 which extends from one of the arms 29 of the yoke 30. Also pivotally mounted between the arms of the frame 75 as shown at 82, is a dog 83. One end of this dog is adapted to engage a toothed segment 84 which is fast upon the rock shaft 53, one tooth 85 of this segment being of greater length than the remaining teeth. The opposite end of the dog 83 is arranged to be engaged by an adjustable stop 86, whose purpose is to hold the dog out of the path of all of the teeth of the segment 84, except the tooth 85.

As a further means of regulating the tension of the springs 50, each side of the yoke 30 carries a laterally extending lug 87, which is provided with a threaded opening for the reception of an adjusting screw 88. One end of this screw is adapted to engage an extension 89 of the arms 37, and, as the pivotal mounting of the arms 37 is eccentric with respect to the pins 52, movement of the arms 37 upon the studs 38 will increase or decrease the distance of the adjacent ends of the springs 50 with respect to the pivot pin 28.

The rocker arm 80 is mounted upon one end of the pivot pin 28, while mounted upon the opposite end of this pin is a dog 90 which is adapted to be engaged by an L-shaped arm 91 which is pivotally mounted on a pin 92 which is carried by a bracket arm 93 rigid with the stand. Pivotal movement of the arm 91 in one direction is limited by a stop finger 94 which engages the bracket 93. Pivotally secured to the L-shaped arm 91 as shown at 95, is one end of a rod 96. The opposite end of this rod is provided with an elongaetd slot 97 which receives a pin 98 carried by a bifurcated lever 99 which is fast upon the rock shaft 53. Extending from the lug 26 is a stop 100, which is adapted to be engaged by a lug 101 which projects from one of the arms 29 and serves to limit the downward movement of the trolley pole 33.

The tension of the springs 50 may be further regulated by means of an adjusting screw 102 which threadedly engages the end of the sleeve 48 and extends from one end of the said sleeve for engagement with the end of the projection 47 of the plunger 45. By moving this screw in or out, the distance between the yoke 49 and the arms 37 may be regulated and the tension of the springs 50 governed. The screw 102 is held in adjusted position by means of a lock nut 103.

Pivotally mounted upon the stand, as shown at 104 is a lever 105 and this lever carries a lug 106 which extends through an opening provided in the walls 22 of the socket 13, so that it may engage the outer periphery of the bearing base 10 to hold the stand against horizontal pivotal movement. This lug 106 engages the bearing base 10 only when the trolley pole 33 is in retrieved position and to provide for this, there is provided a plunger 107, whose inner end is located in the path of movement of the bifurcated end 55 and the lever 54 and is adapted to be engaged by said lever when the latter is operated by the downward movement of the trolley pole 33. For this purpose the end of the lever 54 is beveled as shown at 108 so as to engage the inner end of the plunger 107 and the outer end of the said plunger is provided with a head which engages an adjusting screw 109 carried by the lever 105. The lug 106 is normally held disengaged from the bearing base 10 by means of a spring 110 which engages beneath one end of the lever 105 and this spring also acts to force the plunger 107 inward through the engagement of the adjusting screw 109 with said plunger.

The mechanism is protected by a hood 111, which is removably secured in place by suitable fastening devices such as thumb screws 112 which engage stationary portions of the mechanism, while a sleeve 113 is removably secured over the guide sleeve and plunger.

In the operation of the retriever, the springs 50 are tensioned to the desired degree through the adjusting screw 102 and the adjusting screws 88, while the stop screw 73 is adjusted so that it will engage and move the latch bar 68 forward as soon as the trolley wheel passes upward beyond the trolley wire 36. When this occurs, the latch bar will be forced inward so that its inclined or cam end 67 will engage the roller or bushing 66 and force the bar 61 upward from engagement with the tooth 60 of the lever 54. The lever 54 will thus be released so as to permit the plunger 45 to move inward against the compressible strip 44, the latter providing a stop to limit the inward movement of the plunger. This movement of the plunger will relieve a tension of the springs 50 and permit these springs to move in a direction toward trolley pole, so that the latter may swing downward from the position shown in Figure 3 to the position shown in Figure 4. During this downward movement, or at about the time the trolley pole reaches its limit of downward movement, the L-shaped arm 91 will be moved in a position in front of the dog 90, this movement being due to the action of the rock shaft 53 under the influence of the plunger 45 and through the connections of the lever 99 and connecting rod 96 the pole 33 will be prevented from rebounding or moving upward, while the engagement of the bifurcated end 55 of the lever 54 with the plunger 107 will move this plunger outward so as to move the lever 105 upon its pivot and force the lug 106 inward to engage the bearing base 10, so that the trolley pole will be frictionally held against accidental horizontal swinging movement. As the lever 54 will remain in this position until the mechanism is manually reset, the pole will be locked both against accidental upward and lateral swinging movement.

When in its lowered position, the pole (that is, the lug 81 of the yoke 30) will engage the free end of the rocker arm 80 and by pulling upon the usual trolley pole rope (not shown) the pole may be pulled further downward until it engages the stationary arm 100. This downward movement of the pole will rock the rocker arm 80 upon the pivot pin 28 and will, through the connecting rod 77, rock the frame 75 upon the shaft 53, so that the dog 83 will be positioned to engage the tooth 85 of the segment 84, the said dog being now located over the first two teeth due to its engagement with the screw 86. Movement of the frame 75 in one direction is limited by means of a stop 75ª. This engagement of the dog 83 and tooth 85 will rock the shaft 53 the distance of one tooth 60 of the lever 54 and will cause the bar 61 to engage the first tooth of this lever to hold the rock shaft in this position. Movement of the lever 54 will cause the plunger 45 to move outward and impart an initial tension to the springs 50. This tension will be sufficient to move the trolley pole 33 upward when the pull upon the rope is released and the dog 83 will then move over and engage the second tooth of the segment 84, so that another downward pull upon the rope will move the trolley pole 33 downward to again rock the arm 80 and move the rocker arm a sufficient distance to permit the second tooth 60 to be engaged by the bar 61. This will cause the plunger to move further outward and impart additional tension to the springs 50. This operation is again repeated, so that the third tooth 60 of the lever 54 will be engaged by the bar 61 and the plunger 45 will then be moved fully outward so that proper tension is imparted to the springs and the parts will be again in position for use.

As the mechanism is being reset and during the first downward pull upon the trolley pole 33, the pin 98 of the lever 99 will move freely outward within the slot 97 so that no movement is imparted to the rod 96. During the second operation however, this rod 96 is moved sufficiently to move the L-shaped arm 91 toward the end of the lug 90, so that the third downward movement of the trolley pole will release the arm 91 from the lug 90 and permit the pole to move freely upward for contact with the wire 36. By mounting the opposite ends of the springs 50 in the manner shown and described free pivotal movement of the yoke 30 and arms 37 is permitted without undue friction. The invention also aims to provide an auxiliary spring tensioning means for use in the event of an accident to the mechanism. This consists of a block or arm 114, having an opening 115 therethrough. This block is pivotally mounted in one of the arms 40 and is held therein in a manner to permit of rotation by means of a retaining screw 116. Passing freely through the opening 115 of this block is an eye bolt 117, through whose eye passes a pin 118 carried by the lever 99. The opposite end of the eye bolt 117 is provided with a nut 119 which bears against one face of the block 114, so that by adjusting this nut, the eye bolt 117 may be drawn through the opening of the block so as to swing the lever 99 and rock the shaft 53 to tension the springs. Normally, the bolt 117 is detached from the mechanism and when the said bolt is used, the lever 99 may be disconnected from the rod 96 by the removal of the pivot bolt 98.

The invention is susceptible of various changes in its form, proportions and minor details of construction and the right is herein reserved to make such changes as properly fall within the scope of the appended claims.

Having described the invention what is claimed is:—

1. In a device of the character described, the combination of a supporting means, a trolley pole pivotally supported upon said means, spring means for yieldably retaining said trolley pole in an erect position, means including a latching mechanism for retaining said spring means in a tensioned condition, and a spring pressed latch rod carried by said first mentioned means and adapted to be engaged by said trolley pole to actuate said latching mechanism, thereby relieving said spring means of tension, thus permitting the trolley pole to drop to a lowered position, and a locking means for engaging the trolley pole immediately upon its being dropped to a lowered position for holding the trolley pole in a set position, as and for the purpose set forth.

2. In a device of the character described, the combination of a supporting means, a trolley pole pivotally supported upon said means, spring means for yieldably retaining said trolley pole in an erect position, means including a latching mechanism for retaining said spring means in a tensioned condition, a spring pressed latch rod carried by said first mentioned means and adapted to be engaged by said trolley pole to actuate said latching mechanism, thereby relieving said spring means of tension, thus permitting the trolley pole to drop to a lowered position, a locking means for engaging the trolley pole at the time it drops for preventing its rebounding, and means for releasing the locking means and at the same time restore tension in said spring means, as and for the purpose set forth.

3. In a device of the character described, the combination of a supporting means, a trolley pole pivotally supported upon said means, a spring connecting yoke, springs connected to said yoke, means connecting said springs to said trolley pole, a piston slidably supported upon said supporting means, means connecting said piston to said yoke, a pitman connected to said piston, a segmental gear rack connected to said pitman, means for supporting said rack, a catch frame releasably engaging said rack, and means for moving said catch frame from engagement with said rack, as and for the purpose set forth.

4. In a device of the character described, the combination of a supporting means, a trolley pole pivotally supported upon one end of said means, a latch rod carried by said supporting means and adapted to be actuated by said trolley pole, a catch frame pivotally supported by said supporting means and engaged by said latch rod, a spring supporting yoke, means supporting said yoke and engaged by said catch frame, whereby the yoke is normally held in a set position, coil springs connected to said yoke and means connecting said springs to said trolley pole, as and for the purpose set forth.

5. In a device of the character described, the combination of a supporting means, a trolley pole pivotally supported upon one end of said supporting means, a piston slidable upon the opposite end of said supporting means, a yoke supported upon said piston, springs connected to said yoke, means connecting said springs to said trolley pole, a rotatable shaft supported by said supporting means, a segmental gear rack keyed upon said shaft and having arms extending therefrom, a pitman connected to said arms and to said piston, a catch frame pivotally supported by said supporting means, said catch frame releasably engaging said rack, thus holding the same in a set position, and a shiftable latch rod carried by said supporting means and engaging said catch frame and actuated by said trolley pole, as and for the purpose set forth.

6. In a device of the character described, the combination of a supporting means, a trolley pole pivotally supported upon said supporting means, coil springs, means connecting said springs to said trolley pole, a yoke, said springs also connected to said yoke, means releasably holding said yoke in a set position, said means including a shaft, means for actuating said last mentioned means for permitting the yoke to move, at which time said shaft moves, a lever keyed upon said shaft, a link connected to said lever, a locking lever pivotally mounted upon said supporting means and pivotally connected to said link, as and for the purposes set forth.

7. In a device of the character described, the combination of a supporting means, a trolley pole yoke member consisting of a pair of legs formed upon a body, a trolley pole carried by said yoke member, said yoke member being pivotally supported upon said supporting means, a plate turnably mounted upon each leg, spring connecting means carried by each plate eccentric to the turnable mounting thereof, springs connected to said connecting means, means connected to said springs for holding the same under tension and set screws supported by said plates for turning said plates to increase the tension of the springs, as and for the purposes set forth.

8. In a device of the character described, the combination of a supporting means, a trolley pole supported pivotally upon said supporting means, spring means connected to said trolley pole for normally holding the same erect, means for releasably holding said spring means under tension, means for actuating the third mentioned means for causing the spring means to lose its tension and thus permit the trolley pole to drop, a rocking lever supported upon said supporting means and adapted to be rocked by said trolley pole, and means connected to said rocking lever and associated with said third mentioned means for restoring tension in said spring means as said rocking lever is rocked, as and for the purposes set forth.

9. In a device of the character described, the combination of a supporting means, a trolley pole supported pivotally upon said supporting means, spring means connected to said trolley pole for normally holding the same erect, means for releasably holding said spring means under tension, means for actuating the third mentioned means for causing the spring means to lose its tension and thus permit the trolley pole to drop, a rocking lever supported upon said supporting means and adapted to be rocked by said trolley pole, a pawl frame associated with said third mentioned means, a pawl carried within said frame, a segmental gear carried by said third mentioned means and engaged by said pawl, and an adjustable bar connected to said pawl frame and to said rocking lever, as and for the purposes set forth.

10. In a device of the character described, the combination of a supporting means, a trolley pole pivotally supported upon said supporting means, a shaft supported by said supporting means, spring means connected to said trolley pole for normally holding the same erect, means associated with said shaft and connected to said spring means for holding said spring means under tension, means for automatically actuating said last mentioned means for relieving said spring means of tension, thus permitting the trolley pole to drop, a segmental gear keyed upon said shaft, a pawl frame mounted upon said shaft, a pawl carried by said pawl frame and releasably engaging said segmental gear, a stop for engaging said pawl at times and holding the same from engagement with the gear, and means for swinging said pawl frame upon the moving of said trolley pole, whereby said shaft will be turned for restoring tension in said spring means, as and for the purposes set forth.

11. In a trolley retriever, a supporting means, a trolley pole pivotally mounted thereon, means for yieldingly holding the pole in an erect position, means for automatically releasing the holding means to permit the pole to move to a lowered position, means whereby the supporting means may swing horizontally and means rendered active when the pole is in lowered position to prevent accidental horizontal swinging movement.

12. In a trolley retriever, a supporting means, a trolley pole pivotally mounted thereon, means for yieldingly holding the pole in an erect position, means for automatically releasing the holding means to permit the pole to move to a lowered position, means whereby the supporting means may swing horizontally and means including a normally inactive radially movable brake rendered active when the pole is in a lowered position to prevent accidental horizontal swinging movement of said pole.

13. In a trolley retriever, a support capable of horizontal swinging movement, a trolley pole pivoted upon said support and capable of movement from an inactive position to trolley wire engaging position, yieldable means for holding said trolley pole in trolley wire engaging position, and means actuated by the upward movement of the trolley pole in the event of the trolley wheel thereon leaving the trolley wire to automatically release said yieldable holding means, whereby the trolley pole may be relieved of the influence of said holding means to drop to retrieving position, and means associated with said support for checking the horizontal movement thereof when the trolley pole has dropped to retrieving position.

14. In a trolley retriever, a support capable of horizontal movement, a trolley pole pivoted at its lower end upon said support and having its upper end equipped to engage a trolley wire, spring means for holding the trolley pole in trolley wire engaging position, and means actuated by the movement of the trolley pole beyond the wire in the event of the disengagement of the pole from the wire for automatically releasing the spring holding means and relieving the tension thereon, so that the trolley pole may drop to retrieving position and a brake associated with said support for checking the horizontal swinging thereof when the trolley pole is in retrieving position.

15. In a device of the character described, the combination of a supporting means, a trolley pole pivotally supported upon said means, spring means for yieldingly retaining said trolley pole in an erect position, a rock shaft operatively connected to the spring means, a ratchet mechanism for holding the shaft against movement in one direction, means located in the path of the pole and operatively connected to the shaft for tensioning the spring means and a spring pressed latch carried by the first mentioned means and adapted to be engaged by the trolley pole to actuate the latching mechanism and permit the trolley pole to drop to a lowered position.

16. In a device of the character described, the combination with a supporting means, a trolley pole pivotally supported upon said means, spring means for yieldingly retaining the trolley pole in an erect position, a rock shaft operatively connected to the spring means, a ratchet mechanism for holding the shaft against movement in one direction, a pivotally mounted curved arm located in the path of the pole and operatively connected to the shaft for tensioning the spring means and means carried by the first mentioned means and adapted to be engaged by the trolley pole to actuate the ratchet mechanism and relieve the spring means of tension and permit the trolley pole to drop to a lowered position.

In testimony whereof I affix my signature.

ADRIAN C. VAN HOOYDONK.